(12) United States Patent
Fox

(10) Patent No.: US 9,148,601 B2
(45) Date of Patent: Sep. 29, 2015

(54) CMOS TDI IMAGE SENSOR WITH ROLLING SHUTTER PIXELS

(71) Applicant: Teledyne Dalsa Inc., Waterloo (CA)

(72) Inventor: Eric Fox, Waterloo (CA)

(73) Assignee: Teledyne DALSA, Inc., Waterloo (CA)

( * ) Notice: Subject to any disclaimer, the term of this patent is extended or adjusted under 35 U.S.C. 154(b) by 285 days.

(21) Appl. No.: 13/626,965

(22) Filed: Sep. 26, 2012

(65) Prior Publication Data

US 2014/0085518 A1   Mar. 27, 2014

(51) Int. Cl.
| H04N 5/376 | (2011.01) |
| H04N 5/374 | (2011.01) |
| H04N 5/378 | (2011.01) |

(52) U.S. Cl.
CPC .............. *H04N 5/3765* (2013.01); *H04N 5/378* (2013.01); *H04N 5/3743* (2013.01)

(58) Field of Classification Search
CPC ........................... H04N 5/3743; H04N 5/2353
USPC ........................................................ 348/296
See application file for complete search history.

(56) References Cited

U.S. PATENT DOCUMENTS

| | | | |
|---|---|---|---|
| 4,779,005 A | 10/1988 | Arnold | |
| 5,459,737 A | 10/1995 | Andrews | |
| 5,812,190 A | 9/1998 | Audier et al. | |
| 5,828,408 A | 10/1998 | Mottin et al. | |
| 6,272,207 B1 * | 8/2001 | Tang | 378/149 |
| 6,556,290 B2 | 4/2003 | Maeda et al. | |
| 6,563,539 B1 | 5/2003 | Lefevre | |
| 6,583,865 B2 | 6/2003 | Basji et al. | |
| 6,678,048 B1 | 1/2004 | Rienstra et al. | |
| 6,831,688 B2 | 12/2004 | Lareau et al. | |
| 6,906,749 B1 | 6/2005 | Fox | |
| 6,944,322 B2 | 9/2005 | Johnson et al. | |
| 7,048,551 B2 | 5/2006 | Takayama | |
| 7,268,814 B1 | 9/2007 | Pain et al. | |
| 7,358,996 B2 | 4/2008 | Pantigny | |
| 7,570,354 B1 | 8/2009 | Zhao et al. | |
| 7,675,561 B2 | 3/2010 | Lepage | |
| 7,714,996 B2 | 5/2010 | Yan et al. | |
| 8,039,811 B1 | 10/2011 | Li et al. | |

(Continued)

FOREIGN PATENT DOCUMENTS

| EP | 1667428 A2 | 6/2006 |
| EP | 2088763 A2 | 8/2009 |

(Continued)

OTHER PUBLICATIONS

Lepage, Gerald, et al., "Time-Delay-Integration Architectures in CMOS Image Sensors", IEEE Transactions on Electron Devices, vol. 56, No. 11, Nov. 2009, pp. 2524-2533.

(Continued)

*Primary Examiner* — Roberto Velez
*Assistant Examiner* — Cynthia Segura
(74) *Attorney, Agent, or Firm* — Gowling Lafleur Henderson LLP

(57) ABSTRACT

An improved complementary metal oxide semiconductor image sensor for time delay and integration imaging is provided that utilizes rolling shutter pixels. Columns of rolling shutter pixels in the CMOS image array are provided with a space between adjacent pixels to provide synchronization with movement of the subject in the along track direction. Preferably, the physical offset between the pixels is 1/Nth of a pixel pitch for a column having N rows.

9 Claims, 3 Drawing Sheets

(56) References Cited

U.S. PATENT DOCUMENTS

| | | | |
|---|---|---|---|
| 8,085,327 B2 | 12/2011 | Schrey et al. | |
| 2005/0206762 A1* | 9/2005 | Funakoshi | 348/296 |
| 2008/0079830 A1* | 4/2008 | Lepage | 348/295 |
| 2008/0217661 A1 | 9/2008 | Lauxtermann | |
| 2011/0019044 A1 | 1/2011 | Wang et al. | |
| 2011/0095929 A1 | 4/2011 | Bogaerts | |
| 2011/0115793 A1 | 5/2011 | Grycewicz | |
| 2011/0205100 A1 | 8/2011 | Bogaerts | |
| 2011/0267519 A1 | 11/2011 | Wright et al. | |
| 2011/0279725 A1 | 11/2011 | Cazaux et al. | |
| 2011/0298956 A1 | 12/2011 | Giffard et al. | |
| 2012/0006971 A1* | 1/2012 | Pflibsen et al. | 250/208.1 |
| 2013/0057931 A1 | 3/2013 | Mayer et al. | |
| 2013/0062505 A1* | 3/2013 | Masuda | 250/208.1 |
| 2013/0076955 A1 | 3/2013 | Compton | |
| 2013/0334399 A1 | 12/2013 | Dupont | |
| 2014/0054443 A1 | 2/2014 | Faramarzpour et al. | |

FOREIGN PATENT DOCUMENTS

| | | |
|---|---|---|
| EP | 2109306 A2 | 10/2009 |
| WO | 0028729 A1 | 5/2000 |
| WO | 2010083270 A1 | 7/2010 |
| WO | 2011138374 A1 | 11/2011 |

OTHER PUBLICATIONS

Tsai, Fu-Kai, et al. "A time-delay-integration CMOS readout circuit for IR scanning", ICECS 2002—9th IEEE International Conference on Electronics, Circuits and Systems, vol. 1, 2002, pp. 347-350.

Qu, Hong-song, et al., "Improvement of performance for CMOS area image sensors by TDI algorithm in digital domain", Chinese Academy of Sciences, Journal Article, vol. 18, No. 8, Aug. 2010 (Abstract).

Gao, Jing, et al., "Realization and optimization of time delay integration in CMOS image sensors", Journal of Optoelectronics, vol. 18, No. 10, Oct. 2007, pp. 1162-1165.

Bodenstorfer, Ernst, et al., "High-speed Line-scan Camera with Digital Time Delay Integration", Proceedings of SPIE-IS&T Electronic Imaging—Real-Time Image Processing 2007, vol. 6496, 0277-786X, 2007, Proceedings of SPIE—The International Society for Optical Engineering.

Yacong, Zhang, et al., "A TDI CMOS readout circuit for IRFPA with linearity improvement", 2005 IEEE Conference on Electron Devices and Solid-State Circuits, pp. 589-592, 2006.

Chen, Zhongjian, et al., "288×4 time delay and integration readout IC for infrared focal plane array", Chinese Journal of Electronics, vol. 17, No. 4, Oct. 2008, pp. 624-626.

Kim, C. B., et al., "CMOS TDI readout circuit that improves SNR for satellite IR applications", Electronic Letters, vol. 44, No. 5, 2008, pp. 346-348.

Chen, Zhong-Jian, et al., "Study on test method of TDI function for infrared focal plane array CMOS readout circuits", Journal of Infrared and Millimeter Waves, vol. 27, No. 5, Oct. 2008, pp. 342-345, 400.

Chen, Zhongjian, et al., "A CMOS TDI readout circuit for infrared focal plane array", ICSICT 2008-2009 9th International Conference on Solid-State and Integrated-Circuit Technology Proceedings, 2008.

Zucker, M., et al., "Long, mid-wave infrared detector with time delayed integration", Proceedings of SPIE—The International Society for Optical Engineering, vol. 4820, No. 2, 2003, pp. 580-592.

Tyrrell, Brian, et al., "Time delay integration and in-pixel spatiotemporal filtering using a nanoscale digital CMOS focal plane readout", IEEE Transactions on Electron Devices, Special Issue on Solid-State Image Sensors, vol. 56, No. 11, 2009.

Kim, Chul Bum, et al., "Smart CMOS Charge Transfer Readout Circuit for Time Delay and Integration Arrays", Proceedings of the IEEE 2006 Custom Integrated Circuits Conference, CICC 2006, pp. 651-654.

Lu, Wengao, et al., "A high efficient analog charge delay line for high performance CMOS readout integrated circuits with TDI function", ASICON 2007—2007 7th International Conference on ASIC Proceeding, 2007, pp. 502-505.

Kobayashi, Masako, et al., "480 hybrid HgCdTe infrared focal plane arrays", Proceedings of SPIE—The International Society for Optical Engineering, vol. 4369, 2001, pp. 441-449.

Vizcaino, Paul, et al., "Design of low power CMOS read-out with TDI function for infrared linear photodiode array detectors", NASA, vol. 45, No. 12, Jun. 25, 2007.

Lapage, Gerald, et al., "CMOS long linear array for space application", Proceedings of SPIE—The International Society for Optical Engineering, vol. 6068, 2006.

Kozlowski, L. J. et al., "10×132 CMOS/CCD Readout with 25 micron pitch and on-chip signal processing including CDS and TDI", Society of Photo-Optical Instrumentation Engineers, Conference Paper, 1992.

Sizov, Fiodor F., et al., "Composite readouts with TDI and 'dead' elements deselection", Proceedings of SPIE—The International Society for Optical Engineering, vol. 5074, 2003, pp. 911-917.

Arthurs, C.P., et al., "CMOS/CdHgTe hybrid technology for long-linear arrays with time delay and integration and element deselection", Proceedings of SPIE—The International Society for Optical Engineering, vol. 2744, 1996, pp. 473-485.

Martin, Robert James, et al., "Time division multiplexed time delay integration", SPIE, vol. 930, Infrared Dectectors and Arrays, 1988, pp. 26-43.

Pain, Bedabrata, et al., "CMOS image sensors capable of time-delayed integration", NASA Tech. Briefs, vol. 25, No. 4, 2001.

Kobayashi, Masako, et al., "480×8 hybrid HgCdTe infrared focal plane arrays for high-definition television format", Opt. Eng., vol. 41, No. 8, Aug. 2002, pp. 1876-1885.

Chishko, V.F., et al., "InSb 288×32 FPA with Digital TDI for Low Background Application", 19th International Conference on Photoelectronics and Night Vision Devices, vol. 6636, Proceedings of SPIE—The International Society for Optical Engineering, 2007.

Kayahan, Huseyin, et al., "Realization of a ROIC for 72×4 PV-IR detectors", Proceedings of SPIE—The International Society for Optical Engineering, vol. 6890, 2008.

Lomheim, Terrence S., et al., "Imaging artifacts due to pixel spatial sampling smear and amplitude quantization in two-dimensional visible imaging arrays", SPIE, vol. 3701, 1999, pp. 36-60.

Derkach, Yuriy P., et al., "ROIC for MCT LWIR arrays", Proceedings of SPIE—The International Society for Optical Engineering, vol. 5726, 2005, pp. 140-145.

Christensen, K. N., "Electron microscope studies of oxygen implanted silicon", Oxford University, 1990 (Abstract).

Sizov, Fiodor F., et al., "4×288 linear array with hybrid ROIC (CCD+CMOS)", SPIE, vol. 5726, 2005, pp. 132-139.

Yazici, Melik, et al., "Design of a ROIC for scanning type HgCdTe LWIR focal plane arrays", Infrared Technology and Applications XXXVI, SPIE, vol. 7660, May 2010.

Sizov, Fiodor F., et al., "Comparative analysis of 4×288 readouts and FPAs", Proceedings of SPIE—The International Society for Optical Engineering, vol. 5964, 2005.

McKee, Richard, et al., "Near-room-temperature performance of an SWIR InGaAs/Si hybrid 96 element ×25 TDI high-performance FPA", SPIE, vol. 2746, 1996, pp. 152-161.

Fillon, Patrice, et al., "Sofradir IR detectors for LW applications", Proceedings of SPIE—The International Society for Optical Engineering, vol. 5251, 2004, pp. 45-55.

Walmsley, Charles, et al., "High performance 480×12×4 linear CMOS IR multiplexer", In: Materials and electronics for high-speed and infrared detectors; Proceedings of the Meeting, Denver, CO, Jul. 19, 20, 23, 1999, SPIE, vol. 3794, 1999, pp. 122-133.

Etienne-Cummings, Ralph, et al., "A pipelined temporal difference imager", IEEE, vol. 39, No. 3, Mar. 2004, pp. 538-543.

Chen, Leanord, et al., "Overview of advances in high performance ROIC designs for use with IRFPAs", Proceedings of SPIE—The International Society for Optical Engineering, vol. 4028, 2000, pp. 124-138.

Gilmore, John, et al., "Dental X-ray imaging goes digital", Photonics, vol. 14, No. 10, Oct. 2007, pp. 38-41.

(56) References Cited

OTHER PUBLICATIONS

Klipstein, Philip C., et al., "Advanced IR detector design at SCD: From D3 CTM to ABCS", Proceedings of SPIE—The International Society for Optical Engineering, vol. 5359, 2004, pp. 101-110.

Bevis, Chris, et al. "REBL nanowriter: Reflective electron beam lithography", Proceedings of SPIE—The International Society for Optical Engineering, vol. 7271, 2009.

Walmsley, Charles, et al., "High Performance 480×12×4 linear CMOS IR multiplexer", Proceedings of SPIE—The International Society for Optical Engineering, vol. 3794, 1999, pp. 122-133.

Zimmerman, P.H., et al., "432×432 SW/MW fpas with extended dynamic range", NASA, vol. 40, 2002.

Chatard, Jean-Pierre, "Sofradir second generation IRFPA technology—Recent developments", In: Infrared technology XX, Proceedings of the Meeting, San Diego, CA, Jul. 25-28, 1994, SPIE Proceedings, vol. 2269, 1994, pp. 418-425.

Campos, T., et al., "Low cost shipborne passive infrared search and track", Proceedings of SPIE—The International Society for Optical Engineering, vol. 4130, 2000, pp. 577-580.

Reinheimer, Alice, "Imagers grow to address specialized applications", Laser Focus World, vol. 40, No. 10, Oct. 2004, pp. S4-S6.

\* cited by examiner

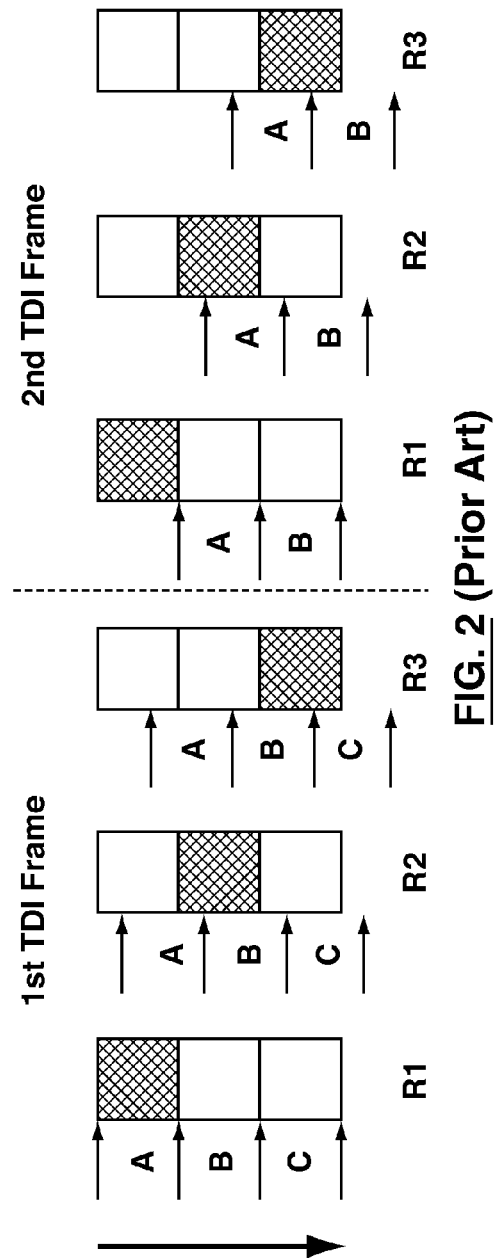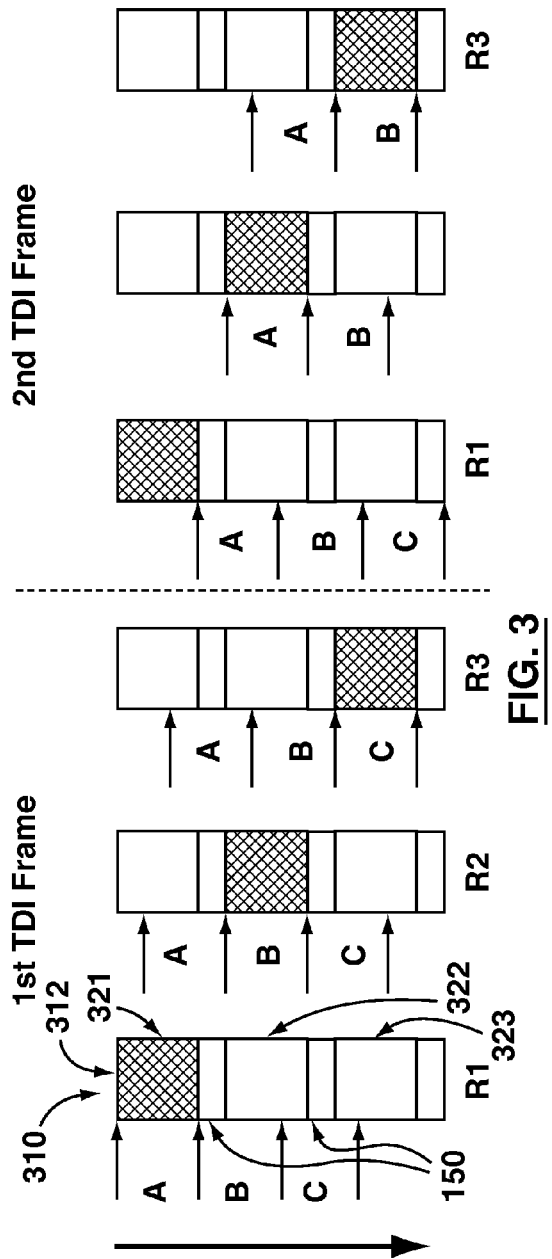

CMOS TDI IMAGE SENSOR WITH ROLLING SHUTTER PIXELS

FIELD

The present disclosure relates generally to CMOS image sensors. More particularly, the disclosure relates to CMOS image sensors that implement time delay and integration with rolling shutter pixels.

BACKGROUND

Time delay and integration (TDI) is an imaging technique that uses a two-dimensional array image sensor to capture images from an imaging platform that is moving relative to the imaged object or scene. As the object or scene moves across the array, the image sensor takes multiple samples and sums these samples in order to improve the signal to noise ratio as compared to a single frame capture of the image sensor. This improvement to signal to noise ratio makes TDI imaging techniques particularly well-suited to applications with low light levels or fast moving objects. Example applications can include medical imaging, machine vision, roll or conveyor belt inspection systems, or terrestrial imaging from aircraft or satellites.

Conventionally, charge-coupled device (CCD) technology has been used for TDI applications because CCDs intrinsically operate by shifting charge from pixel to pixel across the image sensor. This shifting of charge allows the CCD image sensor to accomplish the integration (or adding) of the multiple samples without the addition of complex circuitry and accompanying noise. However, CCD technology is relatively expensive to fabricate and CCD imaging devices consume much more power than comparably sized devices implemented using complementary metal-oxide semiconductor (CMOS) technology.

It could be advantageous to combine CCD and CMOS technologies to generate a hybrid device in which the light capture and associated charge transfer to achieve TDI operation are accomplished with a CCD-like structure that is implemented on a CMOS substrate. By virtue of the CMOS substrate, signal processing and I/O could be implemented with CMOS circuitry in order optimize circuit integration, noise performance, power dissipation, speed, and size. However commercial silicon fabrication technologies that would allow such hybridization are not readily available at present.

Another option could be to hybridize with physically different chips. For example the light capture and TDI charge transfer could be accomplished on a CCD substrate, and the signals from that CCD chip routed to a carrier CMOS chip on which signal processing and final I/O could be implemented. The technology to develop both chips separately is readily available, but the cost associated with a two chip solution plus the expense of chip interfacing (through silicon vias, bond wires, etc.) is still a hurdle.

An alternative to CCDs is to use a CMOS pixel and to perform the summing operation in the voltage domain outside the CMOS pixel array. The signal is converted to voltage directly inside the CMOS pixels and requires adders outside the pixel array. These implementations can be accomplished on a single chip with all-CMOS circuitry. All-CMOS solutions can allow for lower power, higher degree of integration, and higher speed relative to all-CCD implementations, but existing designs suffer from noise issues, such as geometric distortion and a degraded modulation transfer function in the along track direction, when compared to existing CCD TDI image sensors.

Many CMOS sensor arrays use a 4-transistor (4T) pixel structure to maximize fill factor and attempt to minimize noise. The 4T pixels is clocked using a "rolling shutter" technique. This pixel architecture and method of clocking allows for true correlated double sampling (CDS) which largely removes the dominant $K_BTC$ reset noise. The use of rolling shutter clocking can causes artifacts in the acquired image since not all pixels are integrating over the same time period. Using a rolling shutter operation to achieve TDI functionality without any compensatory circuitry or timing will result in the severe loss of responsivity and/or severe modulation transfer function (MTF) degradation in the scan direction.

Attempts at performing TDI in non-CCD image sensors are described in U.S. Pat. No. 6,906,749, EP 1667 428 A2 and U.S. Pat. No. 5,828,408. A CMOS TDI sensor implementation having active pixels with snapshot shutter capability has been described by Pain et al. ("CMOS Image Sensors Capable of Time-Delayed Integration," NASA Tech Brief Vol. 25, No. 4). The snapshot shutter capability means that all pixels start and stop their integration period simultaneously. As a scene pixel moves its focus from pixel to pixel along the column of the CMOS image sensor array, the signal from this scene pixel is multiply sampled, and each sample is integrated onto the storage capacitor on one integrator in the integrator array. The TDI imager must continually keep track of which pixel's output is added to which integrator because the scene pixel moves from pixel to pixel in the imaging array. After a given scene pixel has moved through all rows, the output of the corresponding integrator is sent to an analog-to-digital converter, and the integrator is reset so that it can begin the integration of the new scene pixel that moves into the field of view of the CMOS image sensor array. Of course, all pixels in the column must be connected in turn to the appropriate integrators in the time it takes for a ground pixel to move from one imager pixel to the next. The signal is dumped in a snapshot mode that eliminates motion artifacts that would otherwise be caused by the fact that each imager pixel is addressed at a slightly different time in a rolling shutter operation. The drawback of this approach is that an additional array per column of sample and hold capacitors are required to hold the pixel reset level per pixel. These memory elements are large compared to the pixels themselves and therefore have a significant impact on die size. Another drawback is that the signal must be stored on a node in the pixel for an appreciable fraction of the line time—this requires very careful shielding of the storage node from incoming light (low shutter leakage) or else spatial resolution in the scan direction will be compromised.

The performance challenges associated with developing high quality global shutter pixels, plus the requirement for additional sample and hold circuitry, can be eliminated by using rolling shutter 4T or 5T pixels. In rolling shutter pixels the read operation to eliminate $k_BTC$ reset noise can be accomplished without the use of additional sample and hold circuitry. Shutter leakage requirements can also be relaxed because charge is not stored on the pixel sensor node for any appreciable duration. However architectures based on rolling shutter pixels have other shortcomings that must be addressed. In particular, rolling shutter operation causes artifacts in the acquired image because not all pixels are integrating over the same time period. Each pixel must have acquired exactly the same portion of the scene; otherwise, the modulation transfer function (MTF) in the scan direction will be degraded. If the pixel integration time matches the travel time of the scene from one pixel to the next one, then all pixels must be operated synchronously. This cannot be done with rolling-shutter active CMOS pixels as they typically share the same column bus and only one row can be read at the a time.

LePage et al., "Time-Delay-Integration Architecture in CMOS Sensors" proposes a TDI architecture based on a rolling shutter pixel in which pixel position and pixel clocking is modified in order to compensate for the rolling shutter artifacts. In the described architecture adjacent columns are successively offset by 1/N of a pixel, where N is the number of pixel rows in the scan direction. Two approaches are described, one in which the readout is performed on entire individual columns at one time, and one in which pixels are read out in a diagonal fashion. In the first architecture the number of amplifiers that work in parallel is equal to the number of rows, N, in the scan direction, i.e. one amplifier per row. Since the number of columns in TDI image sensors is typically much larger than the number of rows, the readout speed of this architecture is severely limited relative to more conventional architectures in which all columns can be processed in parallel, i.e. one amplifier per column. The second architecture resolves this issue by using a column-wise readout architecture, but requires that redundant amplifiers be added. Specifically, for N rows in the scan direction, this architecture requires (N+1)/N times as many amplifiers as would ordinarily be required. There are at least three negative impacts associated with these redundant amplifiers: 1) N+1 amplifiers must be squeezed into the space of N columns which increases the size of the smallest pixel pitch that could otherwise be achieved; 2) manufacturing yield is negatively impacted, and; 3) (N+1)/N times as much power is required to run the amplifiers. Another issue is the length of the data bus lines in the pixel array are ~50% longer than normal because these lines must run diagonally. This increases the drive load that the pixel amplifiers see (impact on speed and/or power dissipation), decreases yield, decreases pixel fill factor, increases opportunity for signal crosstalk, and may constrain the smallest pixel pitch that can be achieved with any given CMOS fabrication technology. The diagonal architecture also limits flexibility in how the pixel array is used. For example, the way it breaks spatial symmetry makes it unsuitable to be reconfigured via simple changes in row read timing to be operated as a multichannel device in order to perform colour linescan or hyperspectral image sensing.

SUMMARY

According to one aspect, a CMOS image sensor for time delay integration (TDI) imaging of a subject that is moving with respect to the CMOS image sensor in an along track direction is provided. The CMOS image sensor comprising a two-dimensional array of photosensitive elements each operable in a rolling shutter mode, the array having multiple columns of the photosensitive elements aligned in the along track direction, each of photosensitive elements in a column separated by a physical offset to compensate for integration periods of the photosensitive elements in the rolling shutter mode of operation, and a plurality of column buses, each of the plurality of columns of photosensitive elements coupled to a corresponding one of the plurality of column buses. The CMOS image sensor can further include a control circuit coupled to column buses that is configured to sample the photosensitive elements from the two-dimensional array by row sequentially. In a related aspect, the CMOS image sensor can further include an integration circuit coupled to column buses to integrate the read photosensitive elements of multiple TDI frames. The physical offset can compensate for the movement of the subject in the along track direction during readout of the two-dimensional array, and can synchronize the movement of the subject with the integration period of a subsequent photosensitive element in the column. In some aspects, where the two-dimensional array of photosensitive elements has N rows, the photosensitive elements have a pixel pitch, and the physical offset is $1/N^{th}$ of the pixel pitch. In some aspects, the photosensitive elements operable in rolling shutter mode have an integration period that starts at the end of the last read operation and ends at the start of a subsequent read operation.

According to a second aspect, there is provided an imaging device for capturing a subject in a plurality of frames, the subject moving relative to the imaging device. The imaging device comprises a two-dimensional array of photosensitive elements having a number of columns containing the photosensitive elements, each of the columns coupled to a column bus, adjacent photosensitive elements in each column defining a space therebetween to compensate for synchronizing an integration period of the photosensitive elements with the subject in subsequent frames. In some aspects the photosensitive elements can be implemented as CMOS rolling shutter pixels. In other aspects the image device can further comprise an integration circuit for summing subsequent frames to improve a signal to noise ratio of the captured image.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which:

FIG. 2 is a diagram of a single column CMOS TDI image sensor reading each row in successive TDI frames where the photosensitive elements of the column are adjacent in the along track direction;

FIG. 3 is a diagram of a single column CMOS TDI image sensor reading each row in successive TDI frames where adjacent photosensitive elements of the column have a physical offset between each other in the along track direction.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

The term "integration", as used herein, refers to both charge generation within a CMOS pixel during a period when the pixel is generating photocharge and also to the summing of TDI frames from the photo array. It should be clear from the context used herein which meaning is intended.

Figure 1:
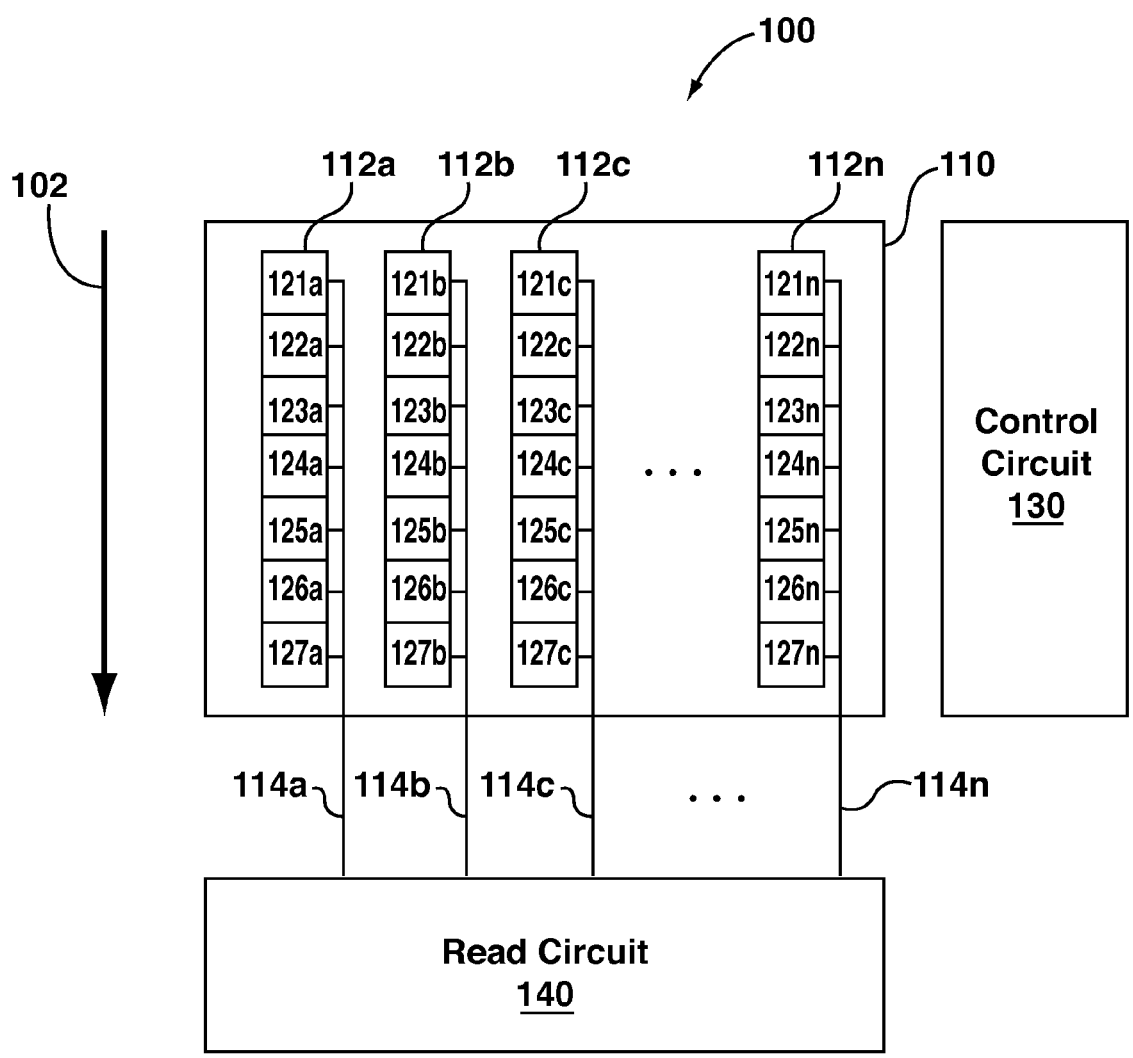
FIG. 1 is a block diagram of a CMOS image sensor for TDI imaging of an object moving in an along track direction with respect to the CMOS image sensor.

Reference is first made to FIG. 1, a block diagram of a CMOS image sensor 100 for TDI imaging of an object moving in an along track direction with respect to the CMOS image sensor 100. The along track direction is indicated by arrow 102. CMOS image sensor 100 has a two-dimensional array 110 of photosensitive elements arranged in columns 112a-n that are each coupled to a corresponding column bus 114a-n. Typical TDI CMOS image sensors are constructed with photosensitive elements 121-127 immediately adjacent one another (i.e. zero gap between adjacent rows).

CMOS image sensor 100 also includes a control circuit 130 that is coupled to column buses 114a-n to coordinate reading two-dimensional array 110. Control circuit 130 is configured to read photosensitive elements 121-127 from two-dimensional array 110 sequentially by row. Control circuit 130 reads rows sequentially by first coupling photosensitive elements 121a-n to their corresponding column bus 114a-n followed by the next row of photosensitive elements 122a-n. Control circuit 130 repeats this for each sequential row until all photosensitive elements 121-127 have been read. In TDI operation this process is repeated to read each TDI frame. The time required to read the entire two-dimensional array 110 (or TDI frame) should be equal to the time required for the object to translate relative to CMOS image sensor 110 in the along track direction by the equivalent of the height or pitch of one photosensitive element 121.

Read circuit 140 samples the output of photosensitive elements 121-127 from column bus 114a-n and performs the TDI integration of TDI frames. Read circuit 140 can be digital or analog, or a combination of both. Read circuit 140 can include analog electronics to sample photosensitive elements 121-127, and also to perform analog to digital conversion. Read circuit 140 can also include a digital memory for storing digital values read from photosensitive elements. Some embodiments can also include digital adders for performing the summation (or integration) between TDI frames, and yet other embodiments can perform integration using analog electronics. In other embodiments, some operations of read circuit 140 can be performed off-chip from CMOS image sensor 100, such as digital summation of TDI frames, for example.

CMOS TDI sensors require low-noise addition of pixels in the along track direction and typically implement photosensitive elements 121-127 as 4-transistor (4T) pixels for their low-noise read operation. 4T pixels can be read out with low noise by correlated double sampling but must be read in a rolling shutter mode. With rolling shutter readout, a pixel begins integrating immediately after it has been read which in a TDI sensor results in each row in a TDI frame having a different integration period. The integration period of a photosensitive element operated in a rolling shutter mode can have an integration period that starts and stops upon transferring the photosignal from the photosite to the sense node of the pixel. In some embodiments, the integration period of the rolling shutter pixel can be shortened using a 5T CMOS pixel that can reset the photosite in between reads. Rolling shutter readout mode is typically a poor choice for TDI sensors because it leads to geometric distortion that manifests itself as a degraded modulation transfer function in the along track direction.

Reference is next made to FIG. 2 which illustrates this geometric distortion when reading typical rolling shutter pixels in a CMOS TDI image sensor. A single column with three photosensitive elements is provided as an example for capturing an object having portions A, B, and C. Photosensitive elements are provided vertically adjacent to one another without a gap as in known CMOS TDI image sensors. Sampling of each row for two successive TDI frames is shown with movement in the along track direction shown by the downward arrow.

TDI with CMOS image sensors typically read each row of the pixel array for every TDI line time. The TDI line time is the time for the object to move relative to the image sensor by a single pixel height. This is illustrated by the downward shift of portions A, B, and C, and particularly how A and B are aligned with the second and third row of pixels at the beginning of the $2^{nd}$ TDI frame. Each row read thus takes 1/N of a TDI line time for an image sensor having N rows. In FIG. 2, each row read takes ⅓ of a TDI line time which is reflected in the translation of ⅓ of a pixel pitch of portions A, B, and C relative to the image sensor between reading successive rows.

The geometric distortion results from the lack of synchronization of rows between TDI frames which leads to a degradation in the vertical modulation transfer function. Ideally, the portions of the object captured by a row in one frame should align with the portion captured in the following frame by the next row. Geometric distortion and degraded MTF occur in the configuration illustrated in FIG. 2 because the portions of the object sampled in rows 1 and 2 in the first TDI frame do not align with the portions of the object sampled in rows 2 and 3 in the second TDI frame. For example, row 1 of the first TDI frame samples portion A directly whereas in the second TDI frame, row 2 is only sampling a part of portion A.

Reference is next made to FIG. 3 which illustrates a CMOS image sensor array 310 for TDI imaging having a column 312 of photosensitive elements 321-323 operable in rolling shutter mode with a physical offset 150 separating vertically adjacent photosensitive elements 323 in a column. CMOS image sensor 300 is illustrated having each of the three rows read for a first and second TDI frame to illustrate improved synchronization between the sensor and the object when column 312 incorporates physical offset 150. CMOS image sensor array 310 is illustrated as single column with 3 rows for example purposes but typically CMOS image sensor array 310 will be implemented as a two-dimensional array. Physical offset 150 compensates for the integration period of sampling the photosensitive elements in a rolling shutter mode of operation. An improvement in the along track modulation transfer function is obtained by using physical offset 150 over known rolling shutter CMOS TDI architectures. This is illustrated by the alignment of portions A, B, and C in subsequent rows in subsequent frames. For example, photosensitive elements in rows 1 and 2 are aligned with the portions A and B in the first TDI frame and rows 2 and 3 are aligned with the same portions in the second TDI frame.

Physical offset 150 compensates for the movement of the object relative to the image sensor during readout of column 312. The time to read a single row is the TDI line time divided by the number of rows in the column. In FIG. 3, the row read time is ⅓ the TDI line time that results in a translation of the object by ⅓ of a pixel height. The physical offset is sized to compensate for the translation of the object relative to the image sensor during the row read time. In FIG. 3 this results in a physical offset of ⅓ of a pixel pitch (or the along track length of the pixel). The physical offset size can be generalized for a column having N rows as $1/N^{th}$ of the pixel pitch.

Figure 4:
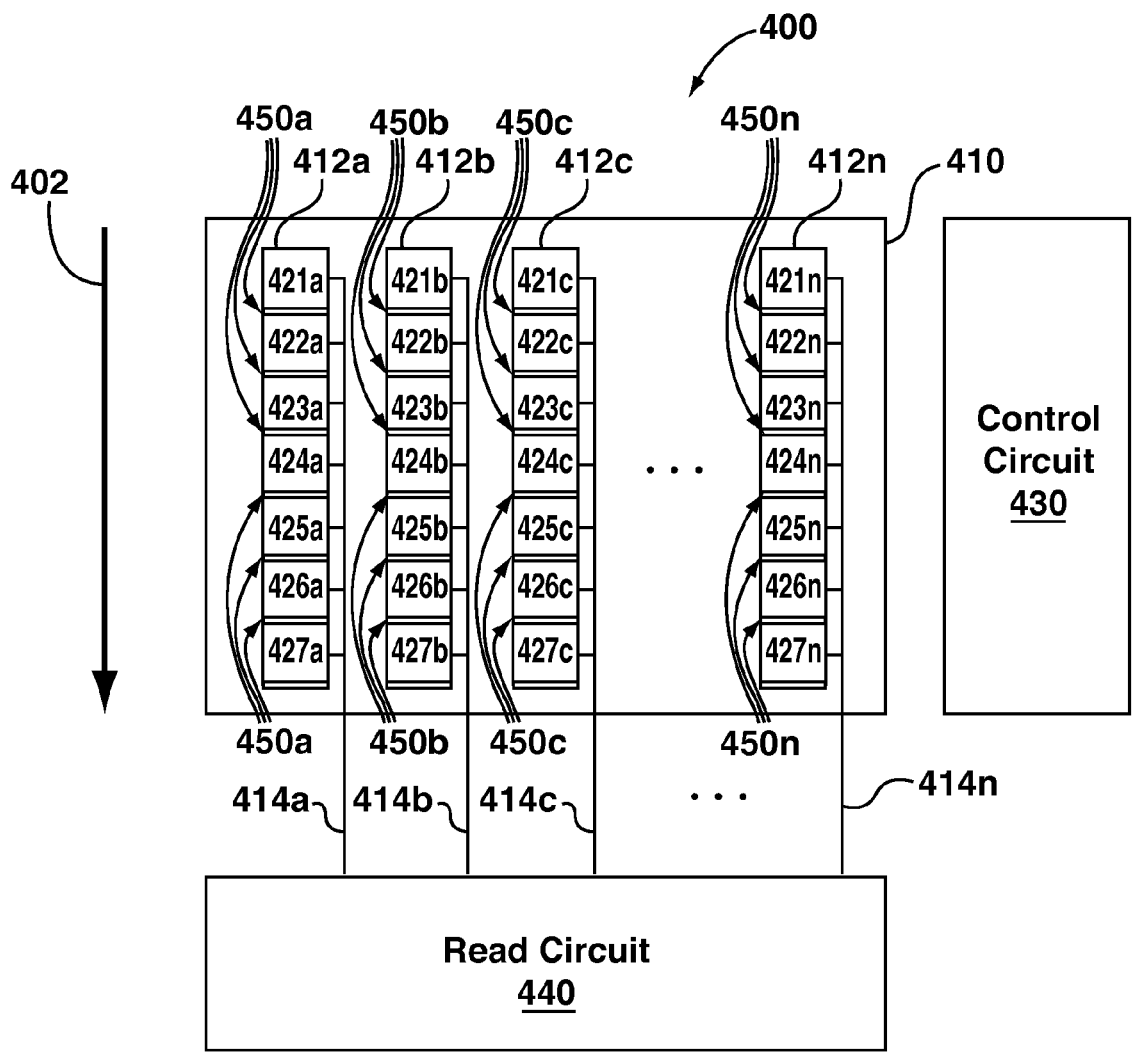
FIG. 4 is a block diagram of a CMOS image sensor for TDI imaging having a physical offset between adjacent photosensitive elements in a column.

Reference is next made to FIG. 4, shown is a block diagram of a CMOS image sensor 400 for TDI imaging having a physical offset 450 between adjacent photosensitive elements 421-426 in the columns 412a-n. Similar elements to FIG. 1 are similarly numbered in FIG. 4. FIG. 4 illustrates multiple columns 412a-n, each having physical offsets 450a-n between adjacent photosensitive elements 421-426. Each of columns 412a-n of two-dimensional array 410 are aligned with each other in the across track direction (i.e. perpendicular to along track direction 402) such that rows and physical offsets 450 are aligned in the across track direction.

Two-dimensional array 410 illustrates that six photosensitive elements 421-426 are distributed in the space of the column that would be occupied by almost seven photosensitive elements 112-127 shown in FIG. 1. Generally, N rows of pixels are distributed over the space that would be spanned by N+1 rows of pixels with no separation between pixels. Using a physical offset 450 of $1/N^{th}$ of the pixel pitch for a column having N rows, the layout of a pixel element having a pitch P would have a height (in the along track direction) equivalent to P×(N+1)/N (with the possible exception of the last photosensitive element 426 of column 412 where no physical offset is needed).

Photosensitive elements 421-426 can be implemented as CMOS pixels that operate with a rolling shutter. Photosensitive elements 421-426 can be implemented with known 4T CMOS pixels that are operated in rolling shutter mode. Other embodiments can use more complex pixels designs, such as, for example, a 5T CMOS pixel that provides an independent reset of the photosite. Rolling shutter pixels are preferable over global shutter pixels that typically have a higher read noise.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

The invention claimed is:

1. A CMOS image sensor for time delay integration (TDI) imaging of a subject that is moving with respect to the CMOS image sensor in an along track direction, the CMOS image sensor comprising:
    a two-dimensional array of photosensitive elements each operable in a rolling shutter mode, the array having a plurality of columns of photosensitive elements aligned in the along track direction, each of the photosensitive elements in a column separated by a physical offset to compensate for integration periods of the photosensitive elements in the rolling shutter mode of operation; and
    a plurality of column buses, each of the plurality of columns of photosensitive elements coupled to a corresponding one of the plurality of column buses;
    wherein the two-dimensional array of photosensitive elements has N rows, the photosensitive elements have a pixel pitch, and the physical offset is $1/N^{th}$ of the pixel pitch.

2. The CMOS image sensor of claim 1, further comprising a control circuit coupled to the plurality of column buses, the control circuit configured to read the photosensitive elements from the two-dimensional array by row sequentially.

3. The CMOS image sensor of claim 2, further comprising an integration circuit coupled to the plurality of column buses to integrate the read photosensitive elements.

4. The CMOS image sensor of claim 1, wherein the physical offset compensates for the movement of the subject in the along track direction during readout of the two-dimensional array.

5. The CMOS image sensor of claim 1, wherein the physical offset synchronizes the movement of the subject with the integration period of a subsequent photosensitive element in the column.

6. The CMOS image sensor of claim 1, wherein photosensitive elements operable in rolling shutter mode have an integration period that starts at the end of the last read operation and ends at the start of a subsequent read operation.

7. An imaging device for capturing a subject in a plurality of frames, the subject moving relative to the imaging device, the imaging device comprising:
    a two-dimensional array of photosensitive elements having a plurality of columns of the photosensitive elements, each of the columns coupled to a column bus, adjacent photosensitive elements in each column defining a space therebetween to compensate for synchronizing an integration period of the photosensitive elements with the subject in subsequent frames;
    wherein the two-dimensional array of photosensitive elements has N rows, the photosensitive elements have a pixel pitch, and the space is $1/N^{th}$ of the pixel pitch.

8. The imaging device of claim 7, wherein the photosensitive elements are CMOS rolling shutter pixels.

9. The imaging device of claim 8 further comprising an integration circuit for summing the plurality of frames to improve a signal to noise ratio.

* * * * *